(12) United States Patent
Friedman et al.

(10) Patent No.: US 9,871,370 B2
(45) Date of Patent: Jan. 16, 2018

(54) BATTERY PACK ADAPTOR WITH OVERSTRESS DETECTION CIRCUIT

(71) Applicant: Black & Decker Inc., Newark, DE (US)

(72) Inventors: Brian E. Friedman, Baltimore, MD (US); Bhanuprasad V. Gorti, Perry Hall, MD (US); Christopher R. Held, Glen Rock, PA (US); Abhisheka Moturu, Pikesville, MD (US); Michael Varipatis, Fallston, MD (US); Paul J. Wisniewski, Baltimore, MD (US); Michael W. Roberts, Red Lion, PA (US)

(73) Assignee: Black & Decker, Inc., New Britain, CT (US)

( * ) Notice: Subject to any disclaimer, the term of this patent is extended or adjusted under 35 U.S.C. 154(b) by 150 days.

(21) Appl. No.: 14/842,220

(22) Filed: Sep. 1, 2015

(65) Prior Publication Data

US 2017/0063073 A1    Mar. 2, 2017

(51) Int. Cl.
| | |
|---|---|
| *H02H 3/00* | (2006.01) |
| *H02H 3/087* | (2006.01) |
| *H02H 7/20* | (2006.01) |
| *H01M 10/6235* | (2014.01) |

(52) U.S. Cl.
CPC ............ *H02H 3/087* (2013.01); *H02H 7/20* (2013.01); *H01M 10/6235* (2015.04); *Y10T 307/729* (2015.04)

(58) Field of Classification Search
USPC ..................................... 361/86–87
See application file for complete search history.

(56) References Cited

U.S. PATENT DOCUMENTS

| | | |
|---|---|---|
| 6,087,815 A | 7/2000 | Pfeifer et al. |
| 6,388,426 B1 | 5/2002 | Yokoo et al. |
| 6,525,511 B2 | 2/2003 | Kubale et al. |
| 6,727,679 B2 | 4/2004 | Kovarik et al. |
| 6,806,694 B2 | 10/2004 | Rupp et al. |
| 7,157,882 B2 | 1/2007 | Johnson et al. |
| 7,339,350 B2 | 3/2008 | Kabale et al. |
| 7,688,028 B2 | 3/2010 | Phillips et al. |
| 7,723,952 B2 | 5/2010 | Phillips et al. |
| 7,932,697 B2 | 4/2011 | Cunabashi et al. |
| 8,093,863 B2 | 1/2012 | Carrier et al. |
| 8,198,835 B2 | 6/2012 | Yokyama et al. |
| 8,237,404 B2 | 8/2012 | Tokano et al. |
| 8,436,584 B2 | 5/2013 | Johnson et al. |

(Continued)

FOREIGN PATENT DOCUMENTS

| | | |
|---|---|---|
| EP | 1903657 A2 | 3/2008 |
| EP | 1291999 B1 | 1/2013 |
| EP | 2602064 A1 | 6/2013 |

*Primary Examiner* — Danny Nguyen (74) *Attorney, Agent, or Firm* — Michael Aronoff; Scott B. Markow (57) ABSTRACT

An adaptor for connecting a power source to a power tool includes a housing having a first end that is configured to connect to a power source and a second end that is configured to connect to a power tool. The adaptor includes a control circuit disposed within the housing. The control circuit is configured to detect an overstress condition in the power tool and to control the power tool responsive to detecting the overstress condition.

14 Claims, 8 Drawing Sheets

(56) References Cited

U.S. PATENT DOCUMENTS

| | | | |
|---|---|---|---|
| 8,598,855 B2 | 12/2013 | Bucur et al. | |
| 8,984,711 B2 * | 3/2015 | Ota | H01M 2/10 |
| | | | 15/339 |
| 2009/0108806 A1 * | 4/2009 | Takano | B25F 5/02 |
| | | | 320/112 |
| 2012/0262035 A1 | 10/2012 | Takano et al. | |
| 2012/0274245 A1 | 11/2012 | Takano et al. | |
| 2012/0293096 A1 | 11/2012 | Mizoguchi et al. | |
| 2013/0025893 A1 | 1/2013 | Ota et al. | |
| 2013/0062955 A1 | 3/2013 | Suzuki | |
| 2014/0042981 A1 * | 2/2014 | Kaizo | H02J 7/007 |
| | | | 320/136 |
| 2014/0132079 A1 | 5/2014 | Mergerner et al. | |
| 2014/0159507 A1 | 6/2014 | Johnson et al. | |
| 2015/0022125 A1 | 1/2015 | Takano et al. | |

* cited by examiner

BATTERY PACK ADAPTOR WITH OVERSTRESS DETECTION CIRCUIT

TECHNICAL FIELD

This description relates to a battery pack adaptor having an overstress detection circuit.

BACKGROUND

A power tool includes a motor that is powered by a power source. The power tool may be designed to work with a particular type of power source. For example, some power tools are designed to work mechanically and electrically with a tower battery pack as the power source. It may be desirable to enable such power tools also to work mechanically and electrically with other types of power sources such as, for example, other types of battery packs.

SUMMARY

According to one general aspect, an adaptor for connecting a power source to a power tool includes a housing having a first end that is configured to connect to a power source and a second end that is configured to connect to a power tool. The adaptor includes a control circuit disposed within the housing. The control circuit is configured to detect an overstress condition in the power tool and to control the power tool responsive to detecting the overstress condition.

Implementations may include one or more of the following features. For example, the first end of the housing may be configured to slidably connect with a battery pack and the second end of the housing may include a tower portion that is configured to insertably connect with the power tool. The control circuit may control the power tool responsive to detecting the overstress condition by causing the power tool to stop.

The control circuit may include a microcontroller and a transistor that is operably connected to the microcontroller. The transistor may be configured to measure a power source current and the microcontroller may be configured to control the transistor to cause the power tool to stop in response to the measured current exceeding a threshold current limit. The microcontroller may be configured to determine if the power tool is in a pulse width modulation mode, determine if a current through the transistor is greater than a threshold current limit and, responsive to determining the power tool is in the pulse width modulation mode and the current is greater than the threshold current limit, open the transistor to prevent current flow from the power source to the power tool. The control circuit may further include a diode that is operably connected between the transistor and a positive leg of the power source.

In another general aspect, a method for detecting and controlling an overstress condition in a power tool includes detecting an overstress condition in a power tool by a control circuit disposed within a housing of an adaptor, where the adaptor is operably connected between a power source and the power tool and controlling the power tool by the control circuit disposed within the housing of the adaptor responsive to detecting the overstress condition in the power tool.

Implementations may include one or more of the following features. For example, the controlling the power tool may include causing the power tool to stop responsive to detecting the overstress condition in the power tool. Detecting the overstress condition may include measuring a power source current by the control circuit and comparing the power source current to a threshold current limit. Controlling the power tool may include causing the power tool to stop in response to the measured current exceeding the threshold current limit. The control circuit may include a microcontroller and a transistor that is operably coupled to the microcontroller. Detecting the overstress condition may include determining if the power tool is in a pulse width modulation mode and determining if a current through the transistor is greater than a threshold current limit and controlling the power tool may include, responsive to determining the power tool is in the pulse width modulation mode and the current is greater than the threshold current limit, opening the transistor to prevent current flow from the power source to the power tool.

In another general aspect, a cordless power tool system includes a cordless power tool configured to receive a power source to power the power tool, a power source and an adaptor for connecting the power source to the cordless power tool. The adaptor includes a housing having a first end that is configured to connect to the power source and a second end that is configured to connect to the cordless power tool. The adaptor includes a control circuit disposed within the housing. The control circuit is configured to detect an overstress condition in the power tool and to control the power tool responsive to detecting the overstress condition.

Implementations may include one or more of the following features. For example, the first end of the housing may be configured to slidably connect with a battery pack and the second end of the housing includes a tower portion that may be configured to insertably connect with the power tool. The control circuit may control the power tool responsive to detecting the overstress condition by causing the power tool to stop.

The control circuit may include a microcontroller and a transistor that is operably connected to the microcontroller. The transistor may be configured to measure a power source current and the microcontroller may be configured to control the transistor to cause the power tool to stop in response to the measured current exceeding a threshold current limit. The microcontroller may be configured to determine if the power tool is in a pulse width modulation mode, determine if a current through the transistor is greater than a threshold current limit and, responsive to determining the power tool is in the pulse width modulation mode and the current is greater than the threshold current limit, open the transistor to prevent current flow from the power source to the power tool. The control circuit may further include a diode that is operably connected between the transistor and a positive leg of the power source.

In another general aspect, a system for detecting and controlling an overstress condition in a power tool includes means for detecting an overstress condition in a power tool, where the means for detecting is disposed within a housing of an adaptor and the adaptor is operably connected between a power source and the power tool. The system includes means for controlling the power tool by the means for detecting that is disposed within the housing of the adaptor in response to detecting the overstress condition in the power tool.

The details of one or more implementations are set forth in the accompanying drawings and the description below. Other features will be apparent from the description and drawings, and from the claims.

DETAILED DESCRIPTION

Figure 1:
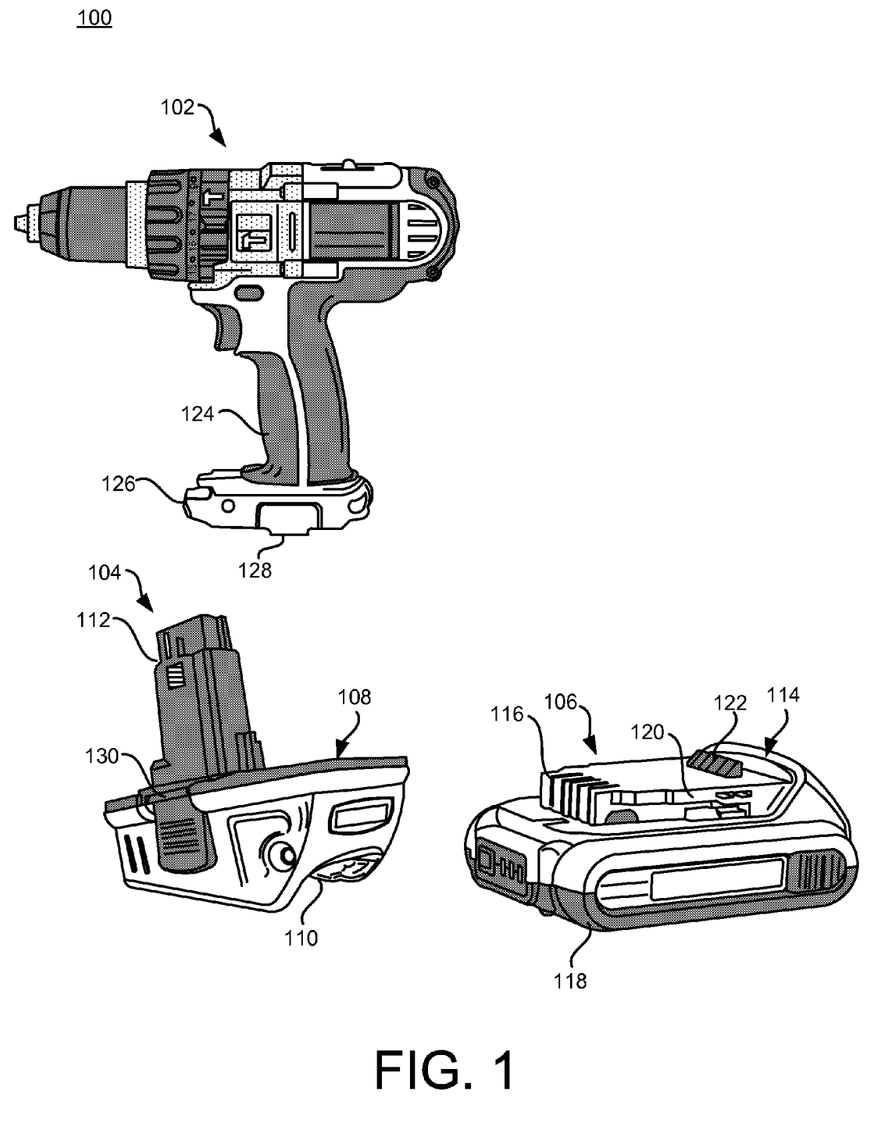
FIG. 1 is an example diagram of a cordless power tool system with the components uncoupled from each other.
Figure 2:
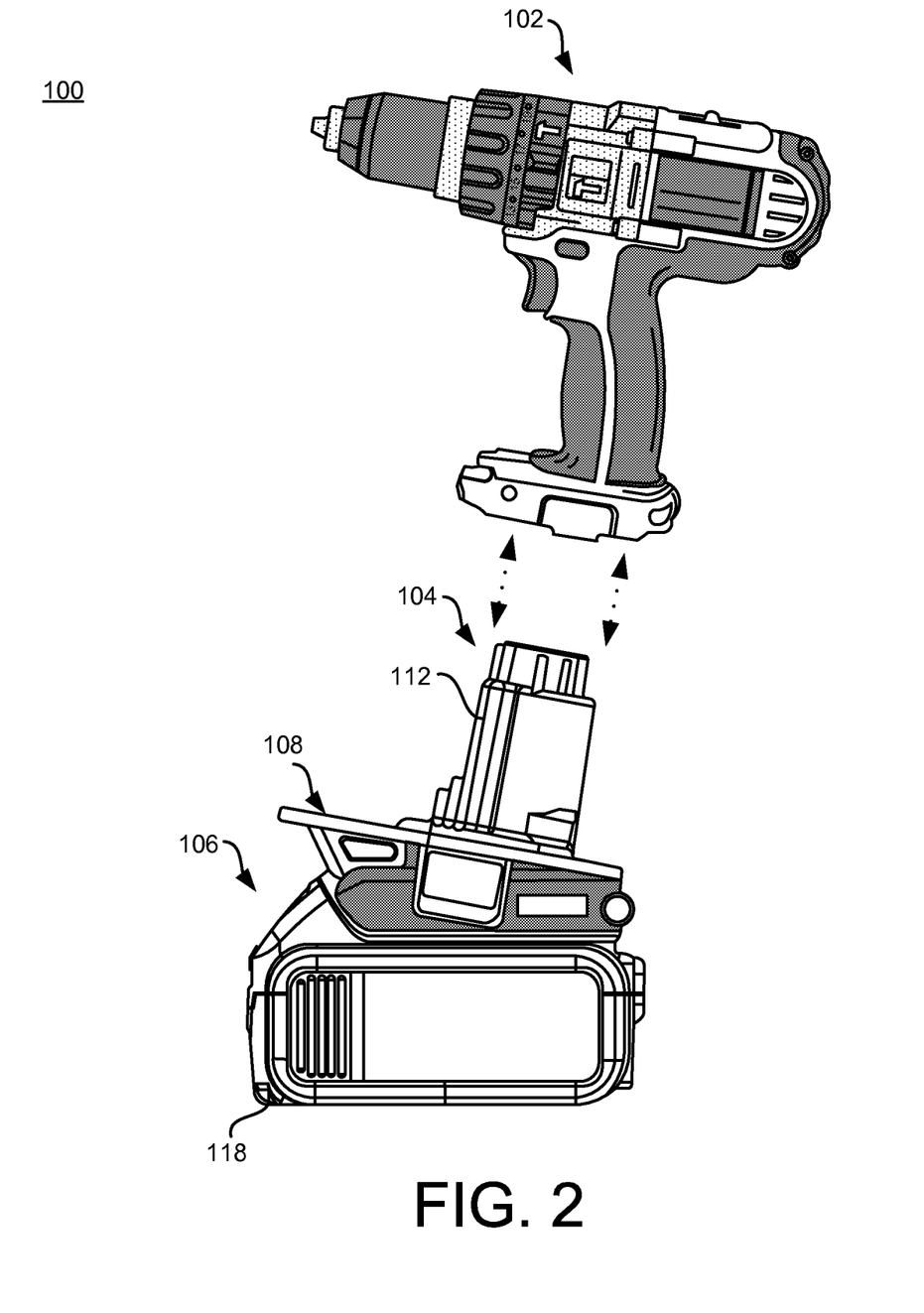
FIG. 2 is an example diagram of the cordless power tool system of FIG. 1 with the adaptor coupled to the power source.
Figure 3:
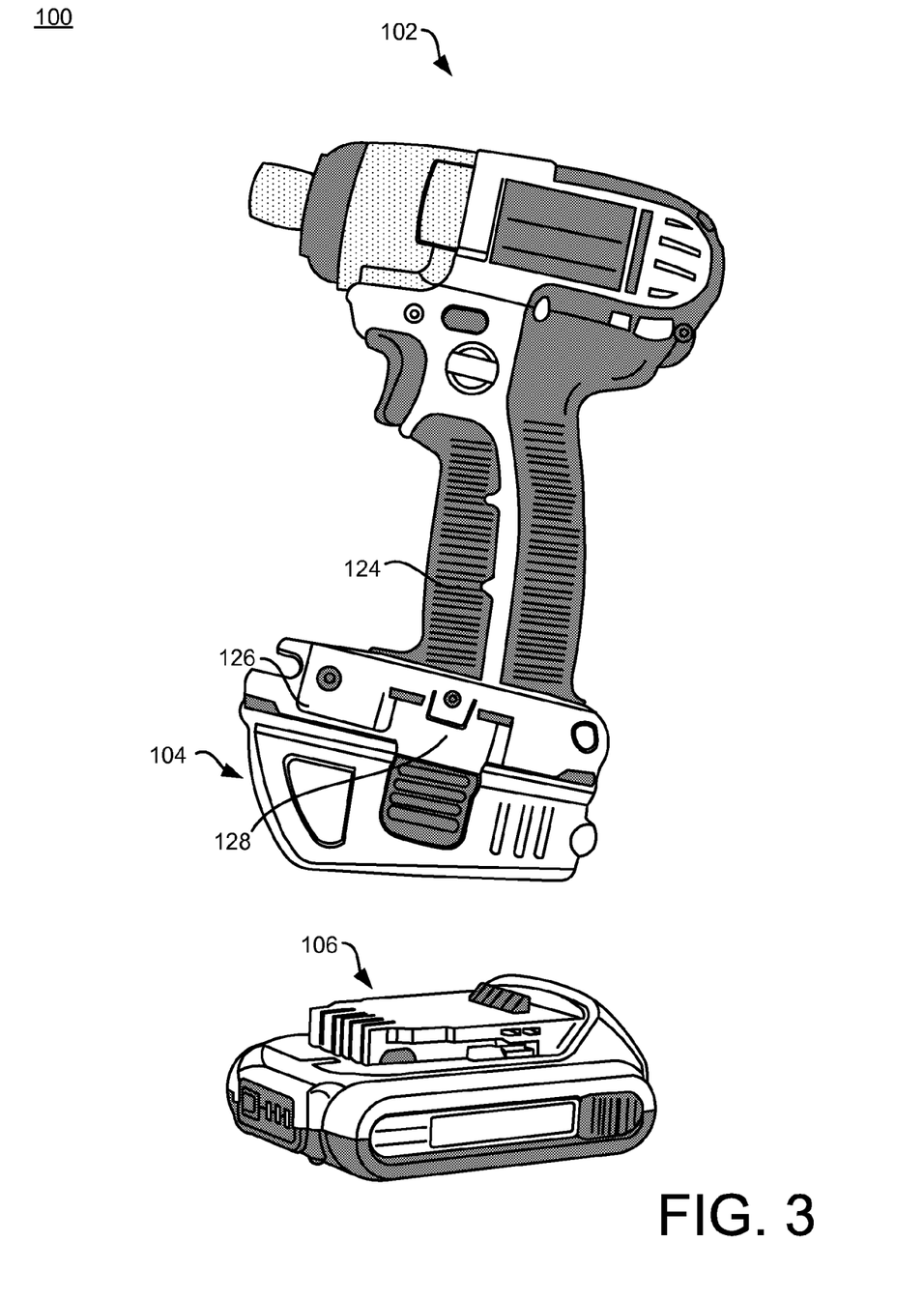
FIG. 3 is an example diagram of the cordless power tool system of FIG. 1 with the adaptor coupled to the power tool.
Figure 4:
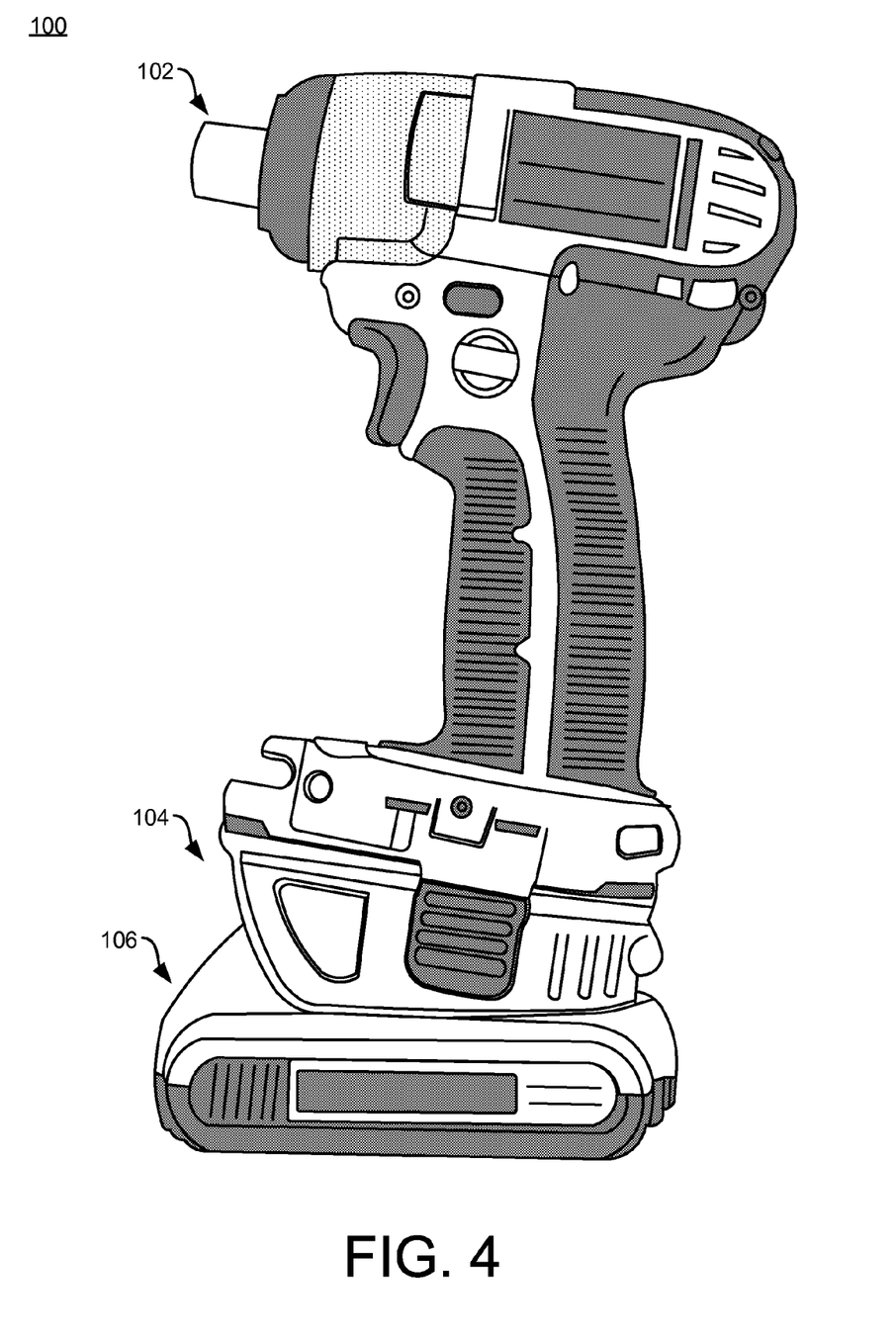
FIG. 4 is an example diagram of the cordless power tool system of FIG. 1 with the components coupled together.

FIG. 1 is an example diagram of a cordless power tool system 100. The power tool system 100 includes a cordless power tool 102 (or power tool 102), an adaptor 104 and a power source 106. The power tool 102 may be any type of cordless power tool that is mechanically and electrically configured to receive a tower-type power source such as, for example, a tower battery pack (not shown). For example, in FIGS. 1 and 2, the power tool 102 is a cordless drill that is configured to receive a tower battery pack (not shown) to power the cordless drill. The cordless drill is mechanically and electrically configured to receive the tower battery pack (not shown). It may be desirable to enable the power tool 102 to operate with other types of power sources, such as the power source 106, where the power source 106 is a slide battery pack. Similarly, in FIGS. 3 and 4, the power tool 102 is a cordless impact driver that is configured to receive a tower battery pack (not shown) to power the cordless impact driver. The cordless impact driver is mechanically and electrically configured to receive the tower battery pack (not shown). It may be desirable to enable the power tool 102 to operate with other types of power sources, such as the power source 106, where the power source 106 is a slide battery pack. In FIGS. 1-4, the reference numeral 102 is used to refer to any power tool, such as a cordless drill, a cordless impact driver, or other cordless power tool, even though FIGS. 1 and 2 illustrate a cordless drill and FIGS. 3 and 4 illustrate a cordless impact driver.

To enable the power tool 102 to operate with the power source 106, the adaptor 104 is used. The adaptor 104 is configured to enable a power source of one type to couple electrically and mechanically with a power tool, where the power tool is configured to work with a power source of a different type. In the example of FIG. 1, the adaptor 104 enables the slide battery pack power source 106 to couple electrically and mechanically with the power tool 102 that is configured to receive a tower battery pack. In this manner, the power tool 102 is enabled to work with multiple, different-types of power sources, including both a tower battery pack and a slide battery pack.

The adaptor 104 includes a housing 108 having a first end 110 and a second end 112. The housing 108 is shaped to couple with a power source at a first end and a power tool at a second end such that the power source provides power to the power tool through the adaptor 104.

The first end 110 is configured to couple (or connect to) with a power source, such as the power source 106. In this example, the first end 110 is configured to slidably connect with the slide battery pack 106. The first end 110 includes a cavity with a set of grooves to receive the slide battery pack 106. The cavity also includes contacts to make an electrical connection between the adaptor 104 and contacts on the slide battery pack 106.

The slide battery pack 106 includes a housing 114 having a top portion 116 and a bottom portion 118. The housing 114 provides a protective cover for the power source contained within the housing 114, such as one or more rechargeable batteries (e.g., one or more lithium ion battery cells), and other components. The top portion 116 includes contacts to make an electrical connection between the power source contained within the housing 114 and the contacts of the adaptor 104. The top portion 116 includes a rail portion 120 on both sides of the top portion 116. The top portion 116 includes a catch mechanism 122 to secure the slide battery pack 106 in place in the adaptor 104.

Referring to FIG. 2, the first end 110 of the adaptor 104 is configured to receive the top portion 116 of the slide battery pack 106. The rail portion 120 of the slide battery pack 106 slides into the cavity of the first end 110 of the adaptor and engages a set of grooves to mechanically couple together. The slide battery pack 106 slides into the cavity along the length of the top portion 116 until the catch mechanism 122 engages with a catch mechanism in the adaptor 104, thus securing the slide battery pack 106 to the adaptor 104. At the same time, electrical contacts in the top portion 116 of the slide battery pack 106 couple with electrical contacts in the adaptor 104 to electrically couple the two components.

Referring also to FIG. 2, an example diagram of the cordless power tool system 100 of FIG. 1 is illustrated with the adaptor 104 coupled to the power source 106. FIG. 2 illustrates that the first end 110 of the adaptor 104 has slidably connected with the top portion 116 of the slide battery pack 106.

Referring back to FIG. 1, the adaptor 104 includes the second end 112, which is configured to be inserted into a power tool, such as the power tool 102, to mechanical and electrically couple with the power tool. The second end 112 of the adaptor 104 is configured as a tower-shaped structure to mate with power tool 102, which is a cordless tower-type power tool that is designed to receive a tower-type power source. The tower-shaped structure on the adaptor 104 enables the power tool 102 to electrically connect with the slide battery pack 106 instead of a tower-type power source that the power tool 102 was designed to use as a power source.

The second end 112 of the adaptor 104 is disposed on the housing 108 at an angle relative to the bottom portion of the housing that would sit on a flat surface. That is, the second end 112, which is the tower-shaped structure, is not perpendicular to a flat surface on which the housing 108 would sit. The housing 108 is shaped such that a top portion of the housing 108 is sloped from a back of the housing 108 upwards towards the front of the housing 108 having the cavity opening to receive the power source 106.

The power tool 102 includes a handle portion 124 having a base 126 and a latch mechanism 128 on the base 126. The handle portion 124 is at least partially hollow to receive a tower battery pack. In this implementation, the adaptor 104 is designed having the tower-type structure such that the adaptor 104 may be inserted into the handle 124 to insertably connect the adaptor 104 to the power tool 102 instead of inserting a tower battery pack. In this manner, the adaptor 104 enables the power tool 102 to work with the slide battery pack 106.

The second end 112 of the adaptor 104 mechanically and electrically couples to the power tool 102. In one implementation, the latch mechanism 128 on the base 126 of the handle 124 engages a tab portion 130 on the adaptor 104 to couple and hold adaptor 104 in the handle 124 of the power tool 102. The second end 112 of the adaptor 104 include one or more electrical contacts to engage with electrical contacts within the power tool 102 to make an electrical connection between the adaptor 104 and the power tool 102. In this manner, circuitry within the housing 108 of the adaptor 104 electrically connects the slide battery pack 106 with the power tool 102 to enable the slide battery pack 106 to provide power to the power tool 102.

Referring also to FIG. 3, an example diagram of the cordless power tool system 100 of FIG. 1 is illustrated with the adaptor 104 coupled to the power tool 102. In this example, the power tool 102 is a cordless impact driver. FIG. 3 illustrates that the second end 112 of the adaptor 104 insertably connects with the power tool 102. The second end 112 has been inserted into the handle 124 of the power tool and the adaptor 104 is secured to the power tool 102 with the latch mechanism 128 on the power tool 102 securing over the tab 130 on the adaptor 104.

Referring also to FIG. 4, an example diagram of the cordless power tool system 100 of FIG. 1 is illustrated with the slide battery pack 106 coupled to the adaptor 104 and the adaptor 104 coupled to the power tool 102. In this example, the power tool 102 is a cordless impact driver. FIG. 4 illustrates all three components, the slide battery pack 106, the adaptor 104 and the power tool 102, mechanically and electrically coupled together. In this manner, a slide battery pack 106 may be used to provide power to a tower-type power tool 102 through the use of the adaptor 104. This allows an existing power tool 102 to receive power from a slide battery pack 106 without any modification to the existing power tool 102 to enable it to connect to the slide battery pack 106. Also, no modifications need to be made to an existing slide battery pack 106 to enable it to electrically couple to the power tool 102. Instead, the adaptor 104 is used to allow the slide battery pack 106 to provide power to the power tool 102 without modification to either the slide battery pack 106 or the power tool 102.

In some implementations, the tower-type power tool 102 is designed to work with a power source having certain specifications such that the power tool 102 works properly and does not become overstressed or damaged. However, the slide battery pack 106 may be more powerful than the tower battery packs that the power tool 102 is designed to work with. Accordingly, the adaptor 104 may include a control circuit to prevent the power tool 102 from becoming overstressed or damaged when receiving power from the slide battery pack 106 without having to modify the power tool 102 or the slide battery pack 106.

Figure 5:
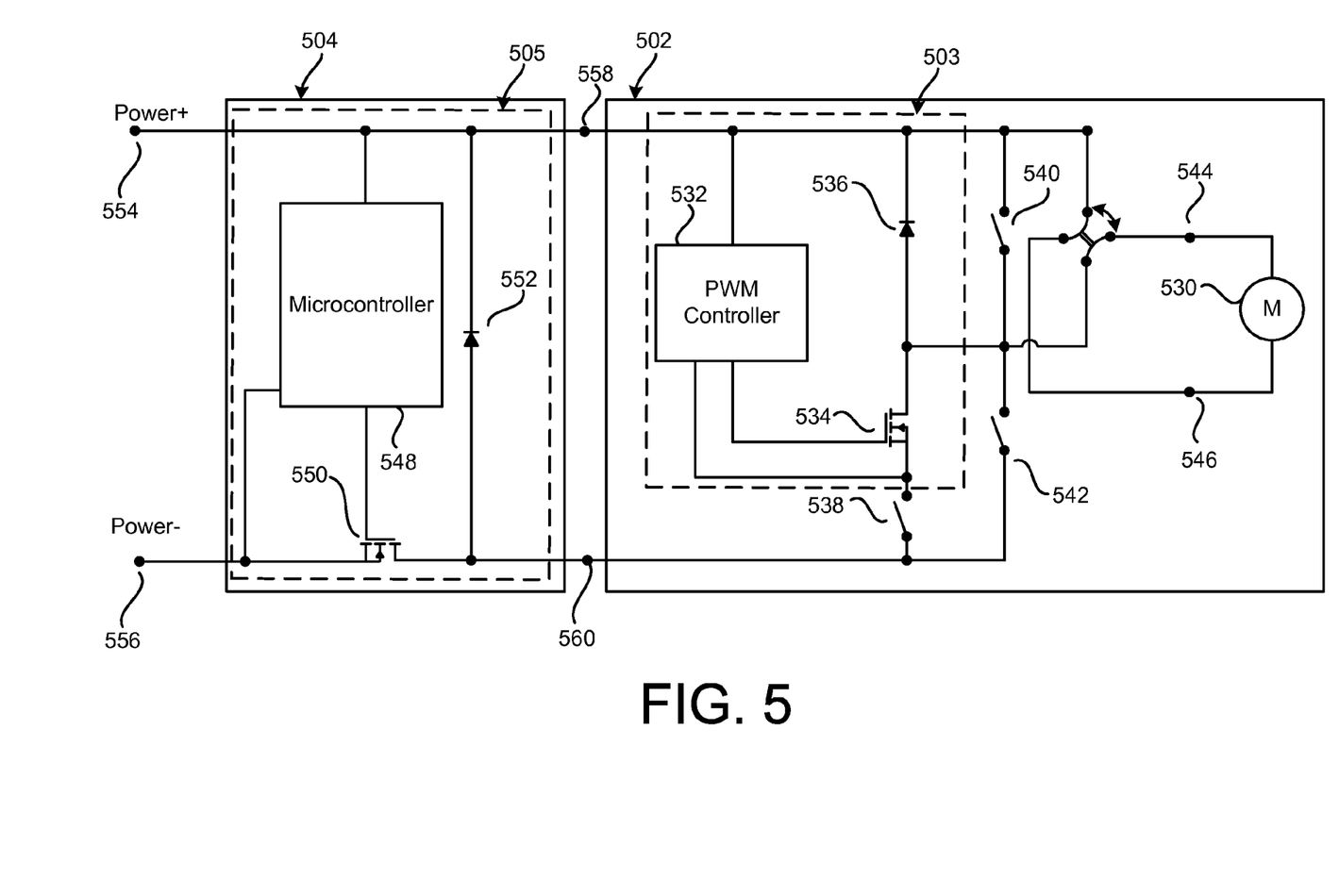
FIG. 5 is an example circuit schematic of an overstress detection circuit within the adaptor of the cordless power tool system of FIG. 1 as connected to a control circuit within the power tool.

FIG. 5 illustrates an example circuit schematic of an overstress detection circuit 505 within the adaptor 504 of the cordless power tool system of FIGS. 1-4 as connected to a control circuit 503 and motor 530 within the power tool 502. The adaptor 504 may include the features and functions as discussed above with respect to the adaptor 104 of FIGS. 1-4 and the power tool 502 may include the features and functions as discussed above with respect to the power tool 102 of FIGS. 1-4.

The control circuit 503 within the housing of the power tool 502 is to control the voltage and/or current being applied to the motor 530 of the power tool 502. The detection circuit 505 within the adaptor 504 is designed to detect and act on an overstress condition occurring within the control circuit 503 when the power tool 502 is being powered by a slide battery pack power source. The control circuit 503 within the power tool 502 is an open loop control system, which enables the detection circuit 505 within the adaptor 504 to be connected to the control circuit 503 to detect and act on any overstress condition within the control circuit 503 of the power tool 502 to prevent damage to the power tool 502.

The control circuit 503 is an open loop variable speed control system. The control circuit 503 includes a pulse width modulation (PWM) controller 532, a transistor 534, a diode 536 and three switches: a main switch 538, a brake switch 540 and a bypass switch 542. The control circuit 503 is connected to the motor inputs 544 and 546 to connect to the control circuit 503 to the motor 530. If the power tool 502 is not coupled to the adaptor 504, then the control circuit 503 connects directly to a power source (not shown), such as a tower battery pack. If the power tool 502 is coupled to the adaptor 504, as depicted in the diagram of FIG. 5, then the control circuit 503 does not connect directly to a power source. Instead, the control circuit 503 connects indirectly to the power source (not shown) through the detection circuit 505 in the adaptor 504.

Briefly, the general operation of the control circuit 503 is described without regards to the operation of the detection circuit 505. When a trigger on the power tool 502 is pulled, the brake switch 540 opens and the main switch 538 closes to enable current to flow from a connected power source to the motor 530, as regulated by the PWM controller 532 and the transistor 534. The PWM controller 532 provides pulse width modulation and variable speed operation of the power tool 502 depending on how far the trigger on the power tool 502 is pulled. The PWM controller 532 adjusts the speed of the power tool 502 depending on the travel of the trigger by adjusting the duty cycle of the motor 530.

In variable speed mode, the PWM controller 532 applies a duty cycle to the connected transistor 534. In the momentary on periods, the power is provided to the motor 530. In the momentary off periods, the motor 530 acts as a generator and the power is dissipated through the diode 536. The motor 530 also may function as an energy storage device through its resistive, capacitive and inductive properties, in which the diode 536 dissipates that energy while the motor 530 is freewheeling. In variable speed mode, when the trigger is not pulled all the way, power also may be dissipated through the transistor 534.

In full speed mode, which also may be referred to interchangeably as bypass mode, the trigger of the power tool 502 is pulled all the way causing both the main switch 538 and the bypass switch 542 to close and the brake switch 540 to open, which has the effect of allowing direct power from the power source to the motor 530. During the full speed mode, the PWM controller 532 is bypassed to enable the full power from the power source to be applied to the motor 530.

With the availability of more powerful battery packs, for example, battery packs with newer and more powerful lithium ion cells, the existing components in the control circuit 503 of the power tool 502 may become overstressed because those components in the control circuit 503 were not designed to operate with the newer, more powerful battery packs. To potentially protect the power tool 502 from damage due to overstress and to mechanically and electrically couple the newer battery packs to the power tool, the adaptor 504 having the detection circuit 505 may be used. The detection circuit 505 is disposed in the housing of the adaptor 504.

The detection circuit 505 includes a microcontroller 548, a transistor 550 and a diode 552. The transistor 550 is operably connected to the microcontroller 548. The diode 552 is operably connected between the transistor 550 and a positive leg of the power source. The detection circuit 505 is configured to detect an overstress condition in the power tool 502 and to control the power tool 502 in response to detecting the overstress condition. The detection circuit 505 may detect an overstress condition in the power tool 502 by determining the voltage and/or current flowing from a power source through the detection circuit 505 in the adaptor 504 to the control circuit 503 in the power tool 502. The detection circuit 505 also may detect an overstress condition in the power tool 502 by monitoring the components in both the control circuit 503 and the detection circuit 505.

A power source (not shown), such as the power source 106 of FIG. 1, connects to the detection circuit 505 at inputs 554 and 556. The inputs 554 and 556 may represent electrical contacts on the adaptor 504 that make electrical contact with the electrical contacts of the power source. The power tool 502 connects to the detection circuit 505 at inputs 558 and 560. The inputs 554 and 556 may represent electrical contacts on the adaptor 504 that make electrical contact with the electrical contacts of the power tool 502. While designated as inputs, the inputs 554, 556, 558 and 560 also may function as outputs or both inputs and outputs.

The transistor 550 is configured to measure a power source current. The transistor 550 may measure the power source current using the translation of the voltage drop across its drain and source through a known or measured drain to source resistance. In other alternative implementations, components other than the transistor 550 may be used to measure the power source current. For example, a shunt, a current transducer or the like may be substituted for the transistor 550 to measure the power source current.

The microcontroller 548 is configured to control the transistor 550. In response to one or more measured conditions as measured at the transistor 550, the microcontroller 548 may take one or more programmed actions. For example, in response to the measured power source current at the transistor 550 exceeding a threshold current limit, which indicates an overstress condition in the control circuit 503 of the power tool 502, the microcontroller 548 can cause the power tool 502 to stop. The microcontroller 548 can cause the power tool 502 to stop by opening the transistor 550 to prevent current from flowing from the power source to the power tool 502. Any energy from the power source and/or the power tool 502 may be dissipated through the diode 552.

The threshold current limit may be set and stored in the microcontroller 548. The threshold current limit may be configurable and may be set based on a current limit of the components in the control circuit 503 that is considered an overstress condition for these particular components. Since the components in the power tool 502 are fixed, the threshold levels for overstress detection can be set in the microcontroller 548 of the adaptor 504.

In response to the measured power source current at the transistor 550 reaching and/or exceeding a current threshold limit, the microcontroller 548 can take actions other than causing the power tool 502 to stop completely. For example, the microcontroller 548 may pulse width modulate the transistor 550 to regulate the amount of current flowing from the power source to the power tool 502, which may prevent an overstress condition from occurring and enable the power tool 502 to continue operating. Also, for example, the microcontroller 548 also may pulse the transistor 550 in such a manner that the power tool 502 provides tactile feedback to the user.

In alternative implementations, the detection circuit 505 may be configured to measure parameters other than, or in addition to, the power source current. For example, the detection circuit 505 may be configured to measure a power source voltage or a combination of the power source current and the power source voltage. The microcontroller 548 may take action based on either the power source voltage or a combination of the power source voltage and power source current reaching and/or exceeding configurable threshold limits to potentially protect the power tool 502 from damage.

In one scenario, when the power tool 502 is operating in pulse width modulation mode (or variable speed mode), the power source current may flow from power source through a closed transistor 550 to the power tool 502. During off switching of the transistor 534, the diode 536 may dissipate the full freewheeling current. The diode 552 would not dissipate any freewheeling current during off switching in this scenario.

In another scenario, when the power tool 502 is operating in bypass mode (or full speed mode), the power source current may flow from the power source through a switching transistor 550 to the power tool 502. During off switching, both the diode 536 and the diode D2 552 may each dissipate a portion of the freewheeling current. Both the diodes 536, 552 may dissipate a percentage of the freewheeling current based on specifications of the particular diodes that may be used in a particular implementation such as, for example, the diode type, path resistance, etc.

The microcontroller 548 may be programmed to detect overstress conditions in the power tool 502 and take action to correct the overstress conditions when the power tool 502 is operating in either variable speed mode and/or in full speed (bypass) mode. For example, the microcontroller 548 may sample the transistor 550 at a rate such that the transistor 534 switching events may be detected cycle by cycle. In this manner, the microcontroller 548 may detect the variable speed (or pulse width modulation) operation and, coupled with the power source current measurements, can calculate or estimate power dissipation through the power tool 502 and take one or more actions in response to those measurements. In this manner, a power tool that is conventionally operated with no control system now has intelligence through the detection circuit 505 in the adaptor 504 and may prevent overstress to the control circuit 503 in the power tool 502 in both variable speed and full speed operation.

In a scenario where the transistor 550 may be synchronized with the transistor 534, both the adaptor 504 and the power tool 502 may be operating in pulse width modulation mode. During off switching of the transistors 534, 550, the diode 536 may dissipate the full freewheeling current. The diode 552 would not dissipate any freewheeling current during off switching in this scenario.

Figure 6:
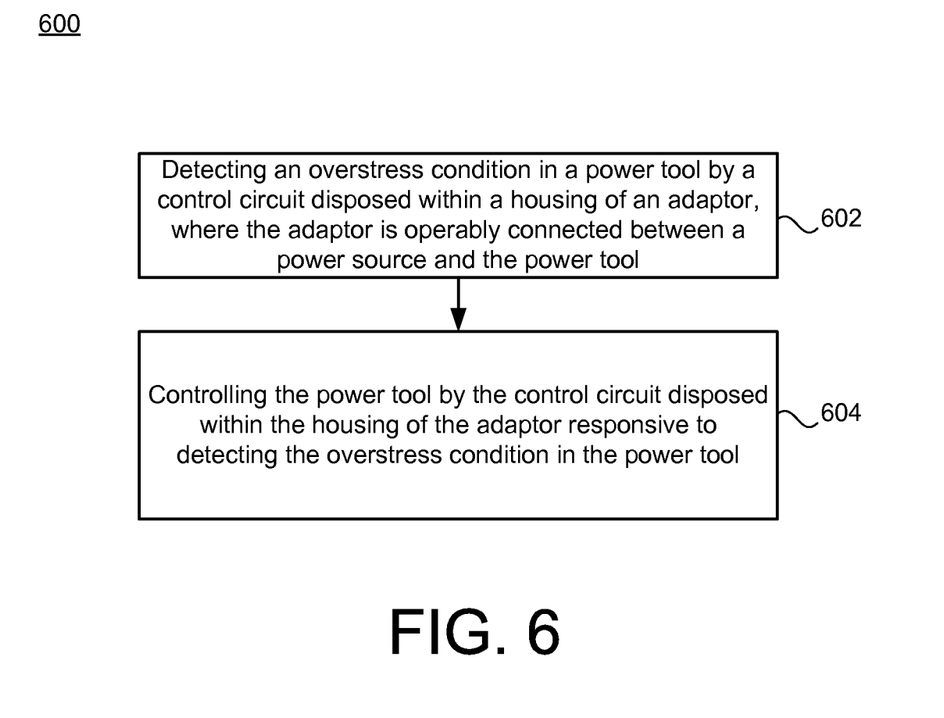
FIG. 6 is an example flowchart illustrating example operations of the adaptor control circuit of FIG. 5.

FIG. 6 is an example flowchart illustrating example operations of the adaptor control circuit of FIG. 5. FIG. 6 illustrates a process 600 for detecting and controlling an overstress condition in a power tool. The process 600 includes detecting an overstress condition in a power tool by a control circuit disposed within a housing of an adaptor, where the adaptor is operably connected between a power source and the power tool (602). For example, as discussed above with respect to FIG. 1 and FIG. 5, the detection circuit 505 is disposed in the housing 108 of the adaptor 104 and the adaptor is operably connected between the power source 106 and the power tool 102. The detection circuit 505 is configured to detect an overstress condition in the power tool 102.

The process 600 includes controlling the power tool by the control circuit disposed within the housing of the adaptor responsive to detecting the overstress condition in the power tool (604). For example, as discussed above with respect to FIG. 1 and FIG. 5, the detection circuit 505 in the adaptor 104 is configured to control the power tool 102 in response to detecting the overstress condition in the power tool 102. Example controlling actions include stopping the power tool 102, slowing down the power tool 102, regulating the speed of the power tool 102 as well as other actions.

The process 600 may detect the overstress condition in the power tool by measuring a power source current by the detection circuit 505 and comparing the power source current to a threshold current limit. As discussed above, overstress conditions may be detected using parameters other than, or in addition to, the power source current.

Also as discussed above, detecting the overstress condition may include determining if the power tool is in pulse width modulation mode and determining if a current through the transistor 550 is greater than a threshold current limit. If the current through the transistor 550 is greater than a threshold current limit and the power tool is in pulse width modulation mode, the microcontroller 548 may open the transistor 550 to prevent current from flowing from the power source to the power tool. In this manner, the detection circuit 505 in the adaptor may protect the power tool from damage.

Figure 7:
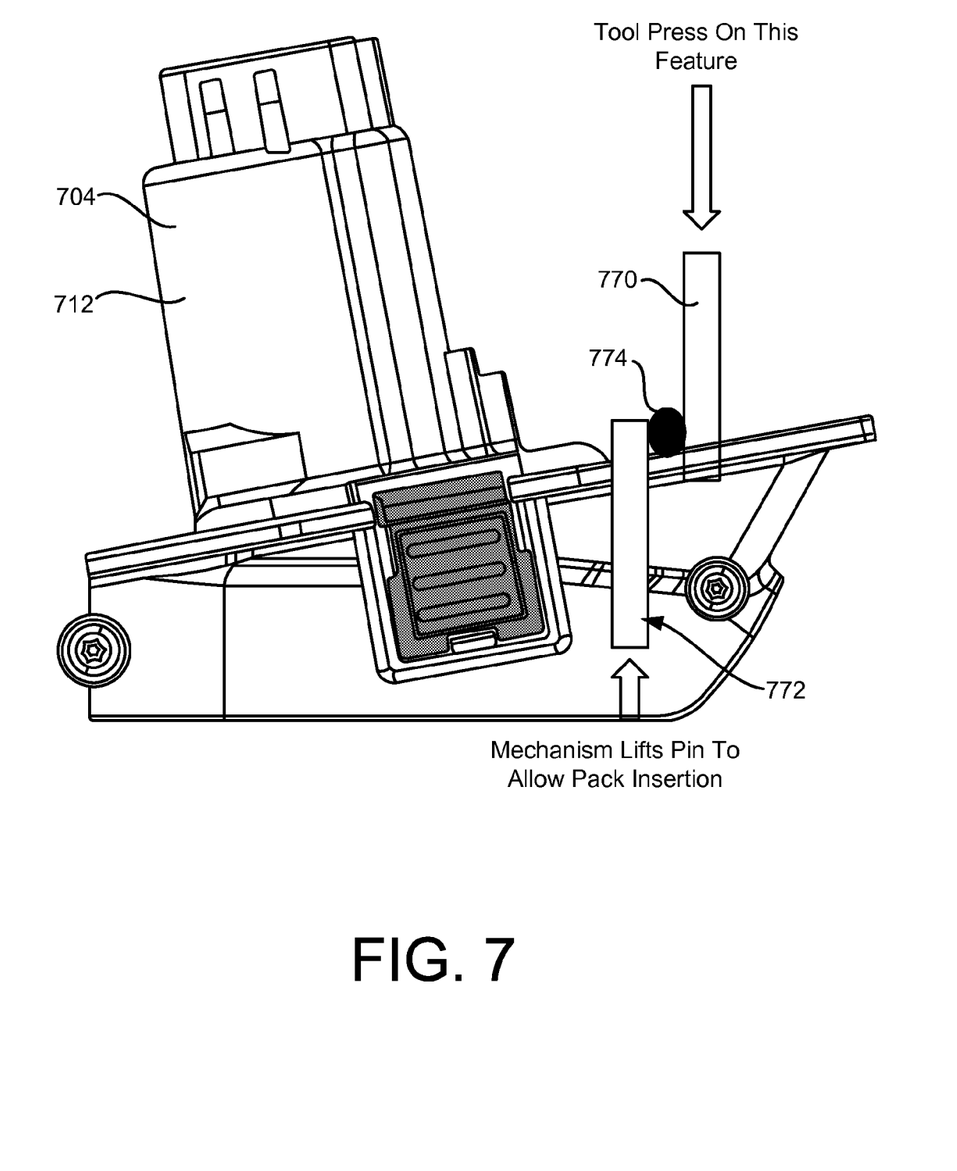
FIG. 7 is an example diagram of an adaptor having a lockout mechanism.

FIG. 7 is an example schematic of an adaptor 704 having a lockout mechanism. The adaptor 704 may function and operate similar to or the same as the adaptor 104 of FIG. 1, including housing the detection circuit 505 of FIG. 5. The adaptor 704 may additionally include lockout mechanism. The lockout mechanism is designed to prevent the adaptor 704 from being coupled to a battery pack unless the adaptor 704 is already coupled to a power tool. In this manner, battery pack voltage leakage may be eliminated or reduced that may otherwise occur when a battery pack is left coupled to an adaptor when not in use with a power tool.

The lockout mechanism includes a first pin 770, a second pin 772 and a pin movement mechanism 774. The first pin 770 is disposed on a top surface of the adaptor 704. The second pin 772 is disposed internal to the adaptor 704 within a cavity where a battery pack is inserted.

When the adaptor 704 is by itself and not coupled to a power tool and not coupled to a battery pack, the first pin 770 is extended above the top surface of the adaptor 704 and the second pin 772 extends into the cavity of the adaptor 704 to prevent a battery pack from being coupled to the adaptor 704.

When the adaptor 704 is coupled to a power tool by inserting the tower portion 717 into a tower-type power tool, the first pin 770 is depressed into the top surface of the adaptor 704. The movement of the first pin 770 acts on the pin movement mechanism 774, which causes the second pin 772 to move up above the top surface of the adaptor 704 (or further above the top surface of the adaptor) and moves out of the cavity thus making a clear path for a battery pack to be coupled with the adaptor. In one implementation, the pin movement mechanism 774 may be a ball or ball bearing secured between the first pin 770 and the second pin 772. In this manner, a battery pack may only be coupled to the adaptor after the adaptor is first coupled to a power tool. This may help prevent or reduce battery voltage leak.

Figure 8:
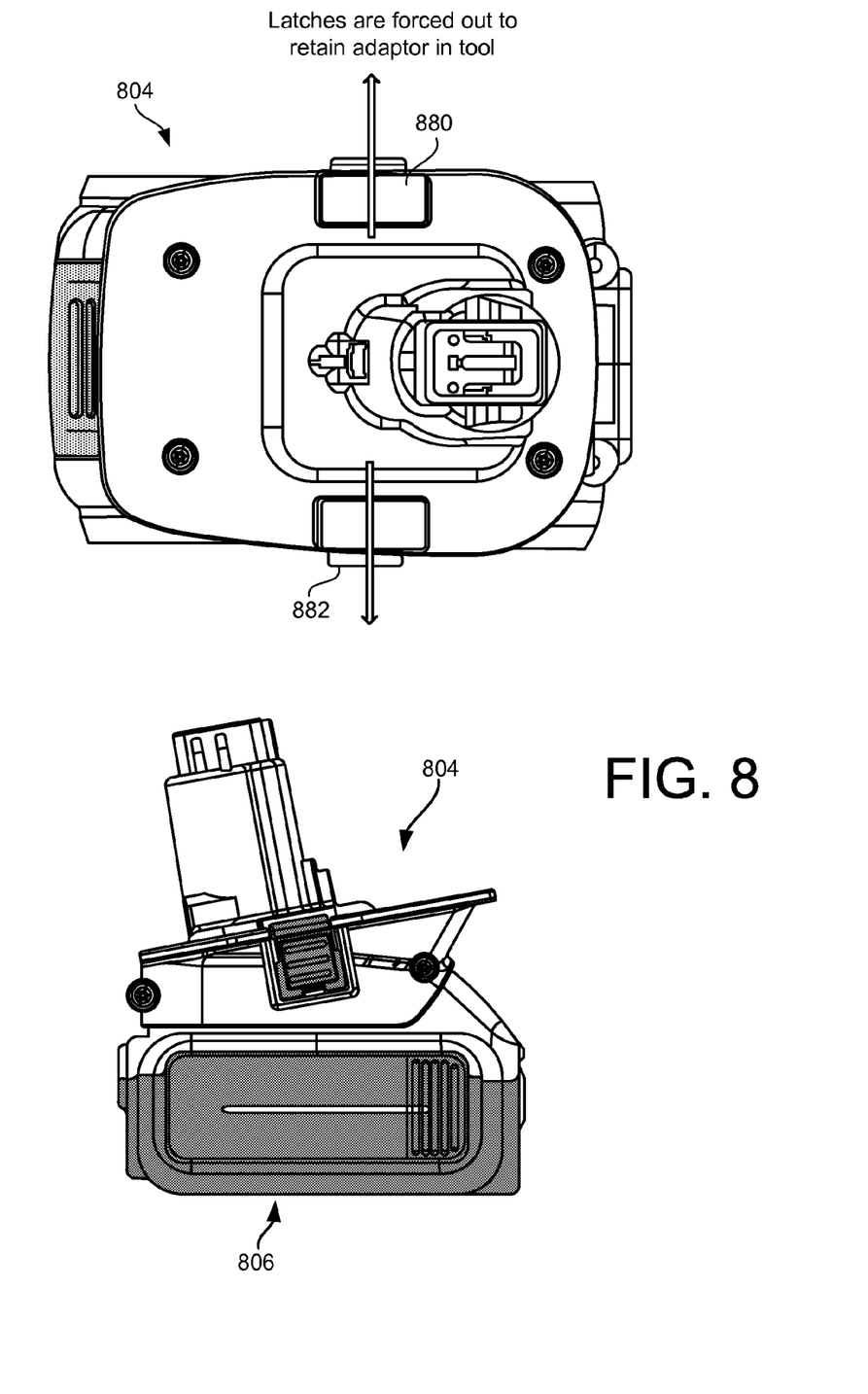
FIG. 8 is an example diagram of an adaptor and a slide battery pack having a unified latch system.

FIG. 8 is an example schematic of an adaptor and a slide battery pack having a unified latch system. The adaptor 804 may function and operate similar to or the same as the adaptor 104 of FIG. 1, including housing the detection circuit 505 of FIG. 5. The adaptor 804 may additionally include latch system that operates in cooperation with a latch system on a battery pack 806.

FIG. 8 illustrates both a side view of the adaptor 804 coupled to the battery pack 806 and a top view of the adaptor 804 coupled to the battery pack 806. The adaptor 804 includes a first latch 880 and a second latch 882. The first latch 880 and the second latch 882 are moveable towards and away from the adaptor housing, as illustrated by the arrows.

In operation, the adaptor 804 is first inserted into a power tool, as described above. When the battery pack is coupled to the adaptor 804, the first latch 880 and the second latch 882 are forced out to retain the adaptor 804 in the power tool. The first latch 880 and the second latch 882 press against the inside of the handle of the power tool to retain the adaptor 804 in the power tool.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An adaptor for connecting a power source to a power tool, the adaptor comprising:
a housing having a first end that is configured to connect to a power source and a second end that is configured to connect to a power tool; and
a control circuit disposed within the housing, wherein the control circuit comprises a microcontroller and a transistor that is operably connected to the microcontroller, the control circuit being configured to:
determine if the power tool is in a pulse width modulation mode,
determine if a current through the transistor is greater than a threshold current limit, and
responsive to determining the power tool is in the pulse width modulation mode and the current is greater than the threshold current limit, open the transistor to prevent current flow from the power source to the power tool.

2. The adaptor of claim 1, wherein:
the first end of the housing is configured to slidably connect with a battery pack; and
the second end of the housing comprises a tower portion that is configured to insertably connect with the power tool.

3. The adaptor of claim 1, wherein the control circuit is configured to detect an overstress condition in the power tool and to control the power tool responsive to detecting the overstress condition by causing the power tool to stop.

4. The adaptor of claim 1, wherein:
the transistor is configured to measure a power source current; and
the microcontroller is configured to control the transistor to cause the power tool to stop in response to the measured current exceeding a threshold current limit.

5. The adaptor of claim 1, wherein the control circuit further comprises a diode that is operably connected between the transistor and a positive leg of the power source.

6. A method for detecting and controlling an overstress condition in a power tool, the method comprising:
detecting an overstress condition in a power tool by a control circuit disposed within a housing of an adaptor, wherein the adaptor is operably connected between a power source and the power tool and the control circuit comprises a microcontroller and a transistor that is operably coupled to the microcontroller and wherein detecting the overstress condition includes:
determining if the power tool is in a pulse width modulation mode, and
determining if a current through the transistor is greater than a threshold current limit; and
controlling the power tool by the control circuit disposed within the housing of the adaptor responsive to detecting the overstress condition in the power tool, wherein controlling the power tool includes responsive to determining the power tool is in the pulse width modulation mode and the current is greater than the threshold current limit, opening the transistor to prevent current flow from the power source to the power tool.

7. The method as in claim 6, wherein controlling the power tool comprises:
causing the power tool to stop responsive to detecting the overstress condition in the power tool.

8. The method as in claim 6, wherein detecting the overstress condition comprises:
measuring a power source current by the control circuit; and
comparing the power source current to a threshold current limit.

9. The method as in claim 8, wherein controlling the power tool comprises:
causing the power tool to stop in response to the measured current exceeding the threshold current limit.

10. A cordless power tool system, comprising:
a cordless power tool configured to receive a power source to power the power tool;
a power source; and
an adaptor for connecting the power source to the cordless power tool, the adaptor comprising:
a housing having a first end that is configured to connect to the power source and a second end that is configured to connect to the cordless power tool; and
a control circuit disposed within the housing, wherein the control circuit comprises a microcontroller and a transistor that is operably connected to the microcontroller, the control circuit being configured to:
determine if the power tool is in a pulse width modulation mode,
determine if a current through the transistor is greater than a threshold current limit, and
responsive to determining the power tool is in the pulse width modulation mode and the current is greater than the threshold current limit, open the transistor to prevent current flow from the power source to the power tool.

11. The cordless power tool system of claim 10, wherein:
the first end of the housing is configured to slidably connect with a battery pack; and
the second end of the housing comprises a tower portion that is configured to insertably connect with the power tool.

12. The cordless power tool system of claim 10, wherein the control circuit is configured to detect an overstress condition in the power tool and to control the power tool responsive to detecting the overstress condition by causing the power tool to stop.

13. The cordless power tool system of claim 10, wherein:
the transistor is configured to measure a power source current; and
the microcontroller is configured to control the transistor to cause the power tool to stop in response to the measured current exceeding a threshold current limit.

14. The cordless power tool system of claim 10, wherein the control circuit further comprises a diode that is operably connected between the transistor and a positive leg of the power source.

* * * * *